United States Patent [19]

Nishimura et al.

[11] Patent Number: 5,712,632
[45] Date of Patent: Jan. 27, 1998

[54] NAVIGATION APPARATUS FOR LAND VEHICLE INPUTTING ROAD TRAFFIC INFORMATION

[75] Inventors: Shigeki Nishimura; Hiroyuki Nakano; Masahiro Nakajima, all of Osaka, Japan

[73] Assignee: Sumitomo Electric Industries, Ltd., Osaka, Japan

[21] Appl. No.: 528,432

[22] Filed: Sep. 14, 1995

[30] Foreign Application Priority Data

Sep. 16, 1994 [JP] Japan ................... 6-221604

[51] Int. Cl.$^6$ ................... G08G 1/123
[52] U.S. Cl. ................... 340/995; 340/905; 340/990; 364/444.1; 364/449.3
[58] Field of Search ................... 340/995, 990, 340/988, 905; 364/444, 449, 436, 444.1, 449.3, 449.4

[56] References Cited

U.S. PATENT DOCUMENTS

| | | | |
|---|---|---|---|
| 5,031,104 | 7/1991 | Ikeda et al. | 340/990 |
| 5,173,691 | 12/1992 | Sumner | 340/995 |
| 5,257,023 | 10/1993 | Furuya | 340/905 |
| 5,371,678 | 12/1994 | Nomura | 340/990 |
| 5,521,826 | 5/1996 | Matsumoto | 340/990 |

FOREIGN PATENT DOCUMENTS

| | | |
|---|---|---|
| 0288068 | 10/1988 | European Pat. Off. |
| 4 008460 | 9/1991 | Germany |
| 62224898 | 10/1987 | Japan |
| 2-129800 | 5/1990 | Japan |
| 4-188181 | 6/1992 | Japan |
| WO92/10824 | 6/1992 | WIPO |
| WO93/18495 | 9/1993 | WIPO |

*Primary Examiner*—Brent A. Swarthout
*Attorney, Agent, or Firm*—W. G. Fasse; W. F. Fasse

[57] ABSTRACT

A navigation apparatus stores road data which are formed by a network of internally stored road links and traveling costs corresponding to the respective ones of the internal road links. When the navigation apparatus receives traffic information corresponding to a specific external road link which is set for communication of traffic information, the apparatus identifies one or more internal links or portions thereof corresponding to the external link for which traffic information has been received, and the stored traveling costs are updated, on the basis of a conversion table. The traveling cost for an internal road link corresponding to a specific external link which is closed to traffic is updated to "∞". The apparatus searches for and identifies a route between an origin and a destination based on the updated traveling costs and the network of the road links. The internal links do not need to correspond directly to the external links, but rather may include more branch points for example. Traffic information of different types and for different links can be processed and assimilated for correspondence with the internal links.

19 Claims, 7 Drawing Sheets

CONGESTION INFORMATION

CONTROL INFORMATION

NAVIGATION APPARATUS FOR LAND VEHICLE INPUTTING ROAD TRAFFIC INFORMATION

BACKGROUND OF THE INVENTION

1. Field of the Invention

The present invention relates to a navigation apparatus which searches for a route between an origin and a destination, and more particularly, it relates to a navigation apparatus which receives road traffic information and searches for a desired route on the basis of the received road traffic information.

2. Description of the Background Art

Japanese Patent Laying-Open No. 2-129800 (1990) discloses a navigation apparatus which receives road traffic information in real time, searches for a recommendable route from the current position to a destination on the basis of the received road traffic information, and displays the same.

In this navigation apparatus, road map data are formed as a network of a plurality of links, and the lengths of the respective links are stored in a memory. When no road traffic information is inputted, a route (recommendable route) having the minimum length of a set of links which are present between the origin and the destination is calculated on the basis of the lengths of the respective links previously stored in the navigation apparatus, and is then displayed.

When road traffic information about traffic congestion or traffic control is received, the navigation apparatus changes the data of the links on the basis of the received road traffic information, and calculates the recommendable route. The road traffic information received by the navigation apparatus includes the number of a congested link and the degree of congestion (information such as "1" or "2" when the average traveling speed around the link is 10 km/h to 20 km/h or less than 10 km/h), which is numeric data responsive or corresponding to the average traveling speed around or in the link.

When the navigation apparatus receives data having a degree of congestion of "1" as to a link which is an expressway (average traveling speed: 90 km/h), for example, it means that the average traveling speed around this link is reduced to 10 km/h to 20 km/h due to the congestion. In this case, the navigation apparatus carries out an operation of 90 km/h÷15 km/h=6, so that the length of this link is weighted to be six times that in an uncongested state. The value 15 km/h represents the average traveling speed around or in the congested link.

When the degree of congestion is "2", on the other hand, the traveling speed is not more than 10 km/h and hence the navigation apparatus carries out an operation of 90 km/h÷5 km/h=18, so that the length of this link is weighted to be 18 times that in an uncongested state. The value 5 km/h represents the average traveling speed around the congested link.

The navigation apparatus carries out routing in consideration of the weighted link data.

In such a navigation apparatus, however, it may be impossible to obtain the optimum route as the recommendable one, for the following reasons:

(1) The links which are included in the road map data stored in the navigation apparatus must be in one-to-one correspondence to those inputted as road traffic information, and the numbers of the former must match with those of the latter. Therefore, the navigation apparatus cannot reserve roads branching away from intermediate portions of the links which are inputted as the road traffic information, for example, as road data. Therefore, the roads employed for the calculation of the recommendable route are limited to the links which are transmitted as the road traffic information. When road traffic data are transmitted from a plurality of transmitting stations and links included in the data transmitted from these stations mismatch with each other, the navigation apparatus cannot cope with all these data.

(2) The navigation apparatus changes the lengths of the links on the basis of several stages of degrees of congestion, and hence the recommendable route cannot be correctly calculated due to errors between the actual required times for passing through the links and those presumed from the lengths of the links.

SUMMARY OF THE INVENTION

The present invention has been proposed in order to solve the aforementioned problems, and an object thereof is to implement correct calculation of a recommendable route in a navigation apparatus having as inputs road traffic information from the exterior.

Another object of the present invention is to provide a navigation apparatus which can calculate a recommendable route also when links inputted as road traffic information are not completely in correspondence to those reserved as road data.

According to the present invention, a navigation apparatus for a land vehicle comprises a first storage unit storing road data which are formed by a network of a plurality of internal links, a second storage unit storing traveling cost data corresponding to the respective ones of the internal links, a receiving unit receiving traffic information corresponding to an external link which is set for communication of traffic information, an identification unit identifying an internal link corresponding to the received traffic information from the stored plurality of internal links, an update unit updating the traveling cost data corresponding to the identified internal link on the basis of the received traffic information, and a search unit which searches for a route between an origin and a destination in accordance with the stored road data and the traveling cost data including the updated traveling cost data. It should be understood herein that the phrase traveling cost data refers to data representing the desirability or undesirability of traveling on a given link based on the required time for traveling through the link, or the length of the link adjusted based on the degree of any traffic congestion or traffic control limitation, or the like.

The receiving unit receives the traffic information corresponding to the external link which is set for traffic information. The identification unit identifies the internal link corresponding to the received traffic information from among the stored plurality of internal links. The update unit updates the traveling cost data corresponding to the identified internal link on the basis of the received traffic information. The search unit searches for the route between the origin and the destination on the basis of the road data and the traveling cost data including the updated traveling cost data.

Thus, the first advantage of the present invention resides in that the navigation apparatus can hold data of internal links not corresponding to external links. In other words, the navigation apparatus can also hold internal links branching away from external links as map data. Thus, the navigation apparatus can hold internal links with no limitation, and thereby enables accurate routing.

The second advantage of the present invention resides in that the navigation apparatus can update the traveling cost data from various traffic data received from two or more stations also when traffic data corresponding to external links of different types are transmitted from the stations.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
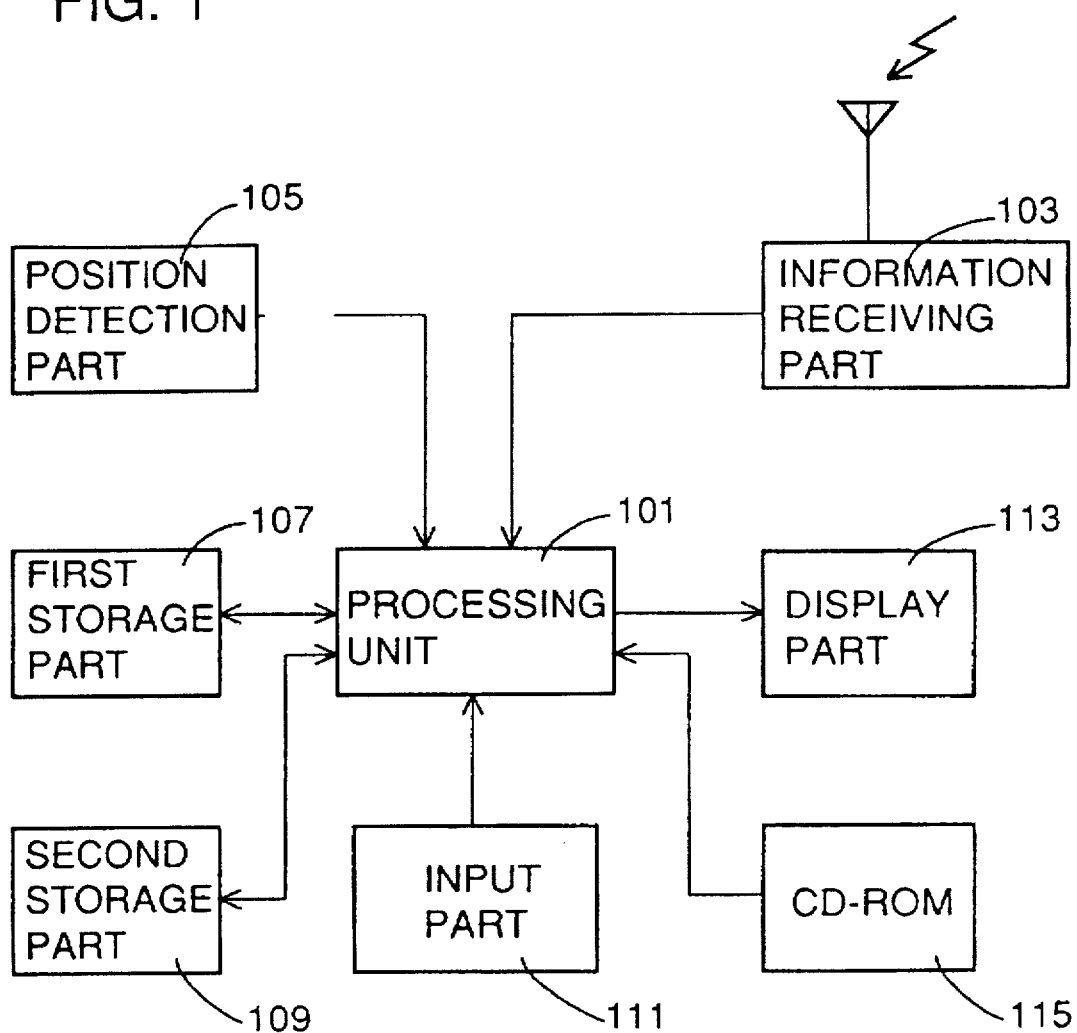
FIG. 1 is a block diagram showing a navigation apparatus according to a first embodiment of the present invention.

Embodiments of the present invention are now described in detail with reference to the drawings. Referring to the drawings, reference numerals which are identical to each other in the several figures denote the same or corresponding components.

(First Embodiment)

Referring to FIG. 1, a navigation apparatus comprises a processing unit 101 carrying out various arithmetic operations, an information receiving part 103 receiving road traffic information which is transmitted from a beacon transmitter provided on the roadside, a position detection part 105 detecting the current position of a vehicle from a signal from a GPS (global positioning system) satellite or the like, a first storage part 107 decoding and storing the received road traffic information, a second storage part 109 storing a conversion table 200 indicating correspondence between information on specific links (hereinafter referred to as external links) which are set for the road traffic information transmitted from the beacon transmitter and information on road links (hereinafter referred to as internal links) provided on map data which are stored in the navigation apparatus and data (traveling cost data) on required times for travelling along the respective ones of the internal links, an input part 111 inputting a destination or the like, a display part 113 displaying the searched route in superposition on a road map, and a CD-ROM 115 storing the road map data and the like.

Figure 2:
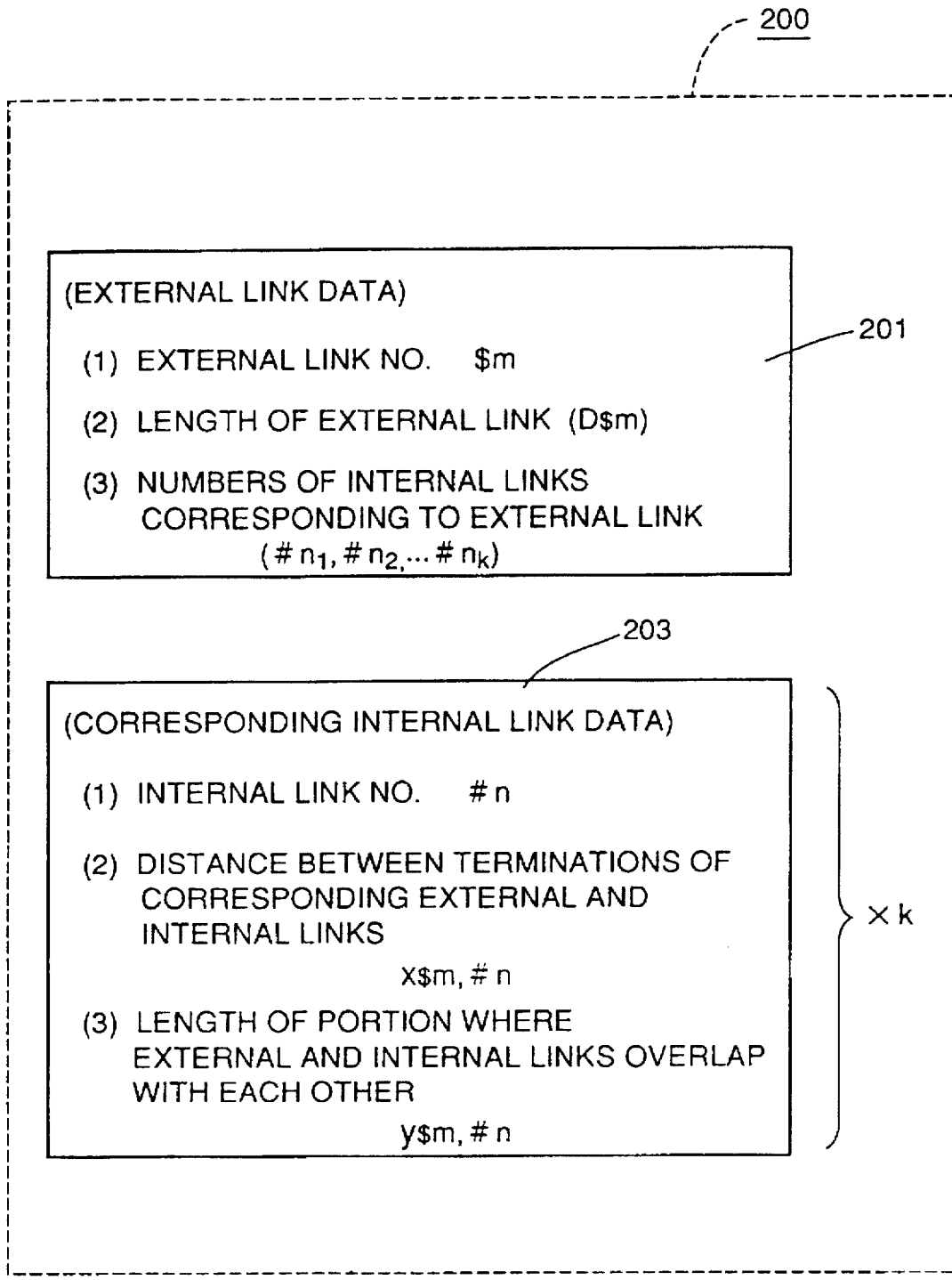
FIG. 2 illustrates a concrete example of a conversion table which is stored in a second storage part 109 shown in FIG. 1.
Figure 3:
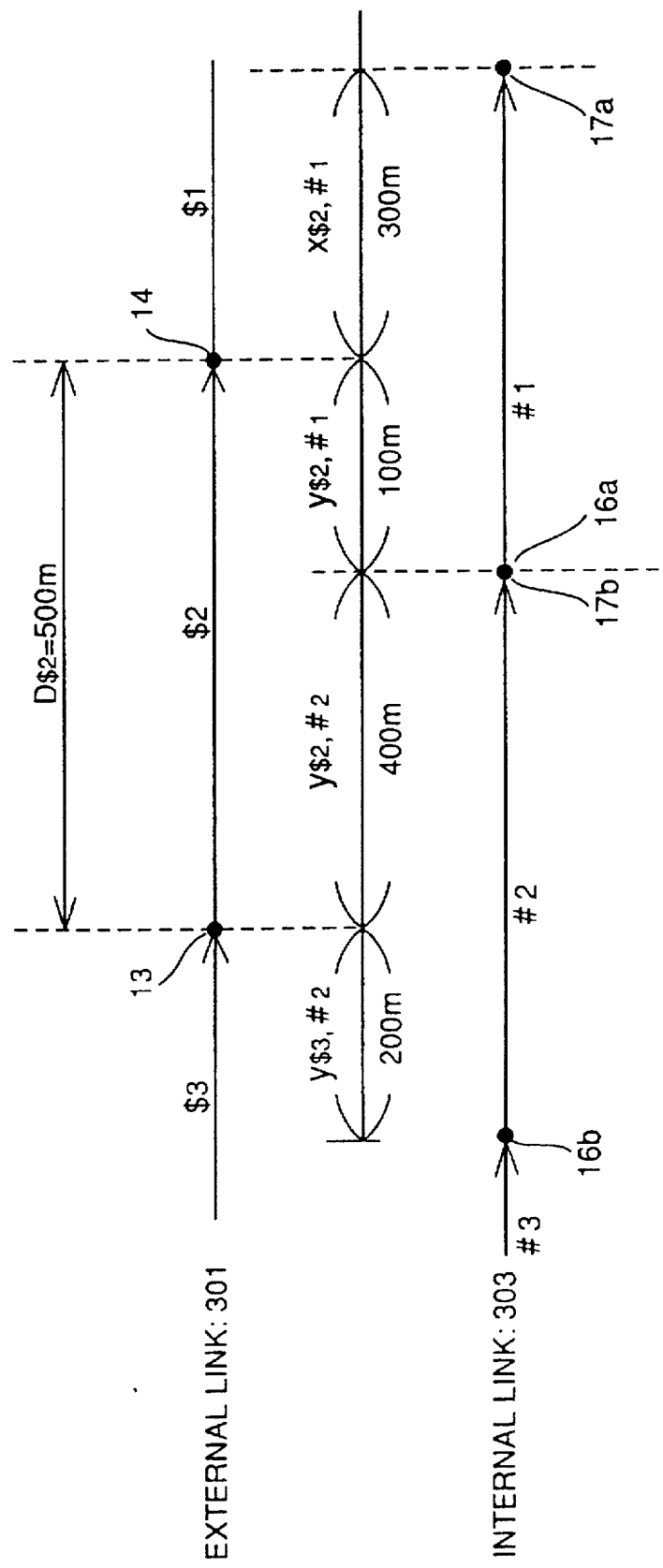
FIGS. 3 and 4 are adapted to illustrate exemplary data which are stored in the conversion table shown in FIG. 2 respectively.

FIG. 2 illustrates a concrete example of the conversion table 200 which is stored in the second storage part 109 shown in FIG. 1, and FIG. 3 is a first diagram for illustrating exemplary data which are stored in the conversion table 200 shown in FIG. 2.

Referring to FIG. 2, the conversion table 200 generally includes external link data 201 and k corresponding internal link data 203 corresponding to the external link data 201.

The external link data 201 include the following data:

(1) External link number ($m) . . . a link number for identifying the external link.

(2) The length (D$m) of the external link.

(3) The number or numbers (#n1, #n2, . . . ) of the internal link(s) corresponding to the external link.

The corresponding internal link data 203 include the following data:

(1) Internal link number (#n) . . . a number for identifying the internal link.

(2) The distance (x$m,#n) between the ending point 14 of the corresponding external link and the ending point 17 of the internal link. The distance between the ending points 14 and 17 of the corresponding external and internal links is stored in this part. If the external link includes the ending point of the internal link, "0" is stored.

(3) The length (y$m,#n) of a portion where the external and internal links overlap with each other, i.e. the length of corresponding portions of the external and internal links.

The corresponding internal link data 203 are stored respectively for and by the number (k) of the corresponding internal links.

When internal links #1 and #2 correspond to an external link No. $2 having the length D$2 of 500 m as shown in FIG. 3, the conversion table 200 of FIG. 2 includes one external link data and two corresponding internal link data, as follows:

(External Link Data)

(1) The external link number $2

(2) The length D$2 of the external link=500 m (3) The numbers #1 and #2 of the corresponding internal links (Corresponding Internal Link Data 1)

(1) The internal link number #1

(2) The distance x$2,#1 between the ending points 14 and 17a of the corresponding external and internal links= 300 m (3) The length y$2,#1 of the portion where the external and internal links overlap with each other=100 m (Corresponding Internal Link Data 2)

(1) The internal link number #2

(2) The distance x$2,#2 between the ending points 14 and 17b of the corresponding external and internal links=m ("0" is stored since the external link $2 includes the ending point 17b of the internal link)

(3) The length y$2,#2 of the portion corresponding to the external link=400 m

Thus, the corresponding internal link data are stored in order from the ending point of the external link toward the beginning point. The conversion table 200 includes not only the data corresponding to the external link $2 but data corresponding to all of the remaining external links, as a matter of course.

Figure 4:
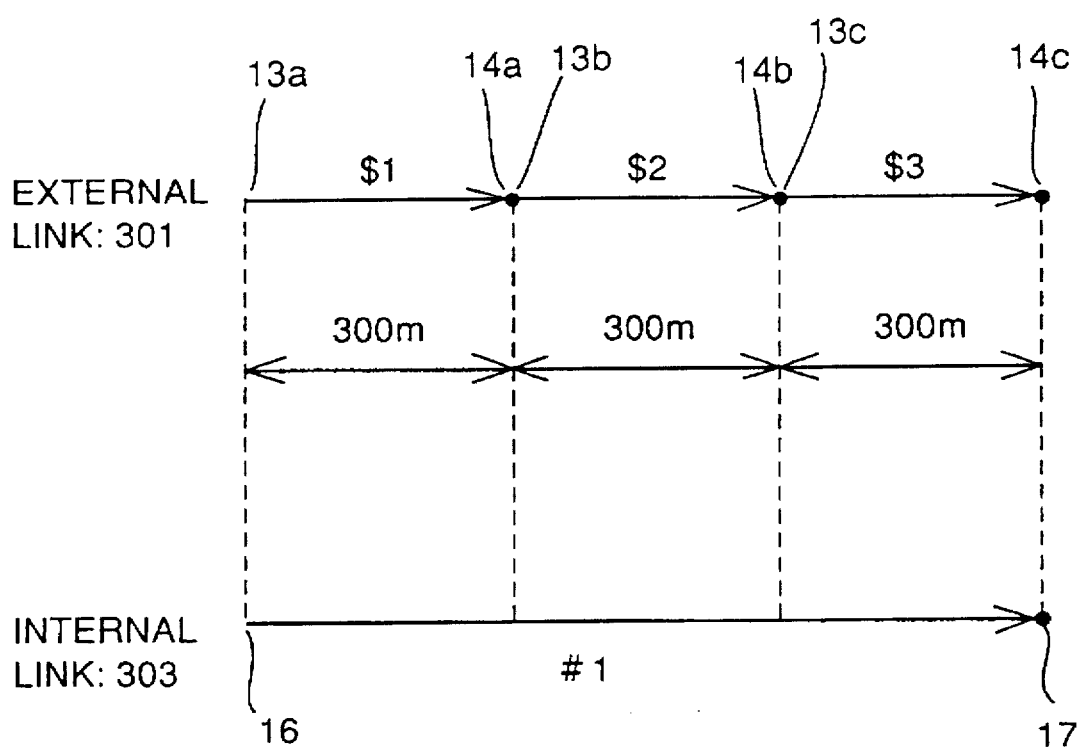

FIG. 4 is a second diagram for illustrating exemplary data which are stored in the conversion table 200 of FIG. 2.

When a plurality of external links 301 correspond to an internal link 303 as shown in FIG. 4, for example, the conversion table 200 includes the following data:

(External Link Data)

(1) The external link number $1

(2) The length D$1 of the external link=300 m (3) The number #1 of the corresponding internal link (Corresponding Internal Link Data 1)

(1) The internal link number #1

(2) The distance x$1,#1 between the ending points 14a and 17 of the corresponding external and internal links=600 m (3) The length y$1,#1 of the portion corresponding to the external link=300 m (External Link Data)

(1) The external link number $2

(2) The length D$2 of the external link=300 m (3) The number #1 of the corresponding internal link (Corresponding Internal Link Data 1)

(1) The internal link number #1

(2) The distance x$2,#1 between the ending points 14b and 17 of the corresponding external and internal links=3000 m (3) The length y$2,#1 of the portion corresponding to the external link=300 m (External Link Data)

(1) The external link number $3

(2) The length D$3 of the external link=300 m (3) The number #1 of the corresponding internal link (Corresponding Internal Link Data 1)

(1) The internal link number #1

(2) The distance x$3,#1 between the ending points 14c and 17 of the corresponding external and internal links=0 m (3) The length y$3,#1 of the portion corresponding to the external link=300 m The operation of the navigation apparatus shown in FIG. 1 is now described. The information receiving part receives coded signals including the required times for traveling along the external links at the present time and traffic information such as control information which are transmitted from the beacon transmitter provided on the roadside, and decodes the signals. The decoded information is stored in the first storage part 107.

When the destination of the vehicle is inputted from the input part 111, internal links in a region including the current position of the vehicle which is detected by the current position detection part 105 and the inputted destination are determined. Data (traveling cost data) on the required times for traveling along the respective ones of the determined internal links, road map data for routing, and the conversion table 200 indicating the correspondence between the external and internal links are transmitted from the second storage part 109 to the first storage part 107. Then, the processing unit 101 carries out required time update processing for updating the required times for traveling along the corresponding internal links based upon the required times for traveling along the respective ones of the external links and the control information which are stored in the first storage part 107. This required time update processing is carried out on the basis of the conversion table 200.

Figure 5:
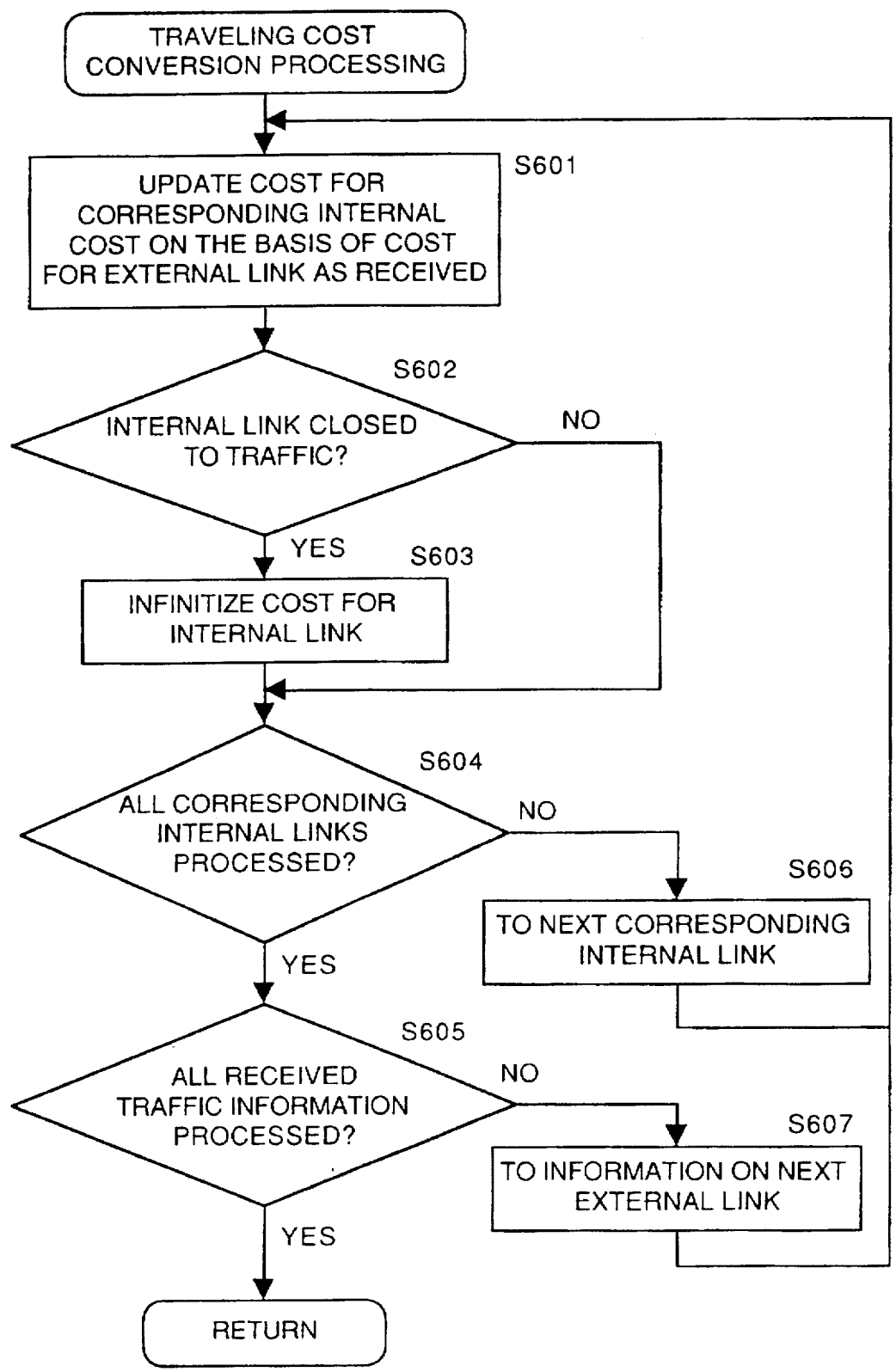
FIG. 5 is a flow chart for illustrating processing for updating the required times (link costs) for passing through links.

FIG. 5 is a flow chart for illustrating the required time update processing for converting the required times (traveling costs) for traveling along the links.

At a step S601, the required times for traveling along the corresponding internal links are updated on the basis of the required times for travelling along the respective ones of the external links as received. Assuming that the internal and external links are in the correspondence shown in FIG. 3, the required time for traveling along the external link $2 is t$2, and the required times for traveling along the previously stored internal links #1 and #2 are t#1 and t#2 respectively, for example, the required times for traveling along the respective links are updated so that:

the required time t#1' for traveling along the link #1 in consideration of the traffic information is as follows:

$$t\#1'=x\$2,\#1 \times t\#1/(x\$2,\#1+y\$2,\#1)+y\$2,\#1 \times t\$2/(y\$2,\#2+y\$2,\#1) \quad (1)$$

and the required time t#2' for traveling along the link #2 in consideration of the traffic information is as follows:

$$t\#2'=y\$3,\#2 \times t\#2/(y\$2,\#2+y\$3,\#2)+y\$2,\#2 \times t\$2/(y\$2,\#2+y\$2,\#1) \quad (2)$$

At steps S602 and S603, the required times for internal links which are closed are infinitized, i.e. set to infinity.

At a step S604, a determination is made as to whether or not all corresponding internal links have been processed. If the determination is NO, then the process is advanced to a next corresponding internal link at a step S606, so that the processing through the steps S601 to S604 is carried out for the next corresponding internal link.

If the determination at the step S604 is YES, on the other hand, then a determination is made at a step S605 as to whether or not all received road traffic information has been processed. If the determination is NO, then the process is advanced to a next external link at a step S607, so that the processing through the steps S601 to S605 is carried out for this next external link.

If the determination at the step S605 is YES, on the hand, then the processing of updating the required times for traveling along the links is completed.

In consideration of the updated required times for traveling along the links, the recommendable route between the origin and the destination is searched for.

Due to the employment of the conversion table indicating the correspondence between the external and internal links, as hereinabove described, arbitrary internal links can be set in the navigation apparatus, so that the route can be displayed and used for guiding the vehicle flexibly and without limitation. Thus, routing can be carried out with higher accuracy as compared to the prior art.

(Second Embodiment)

Figure 6A:
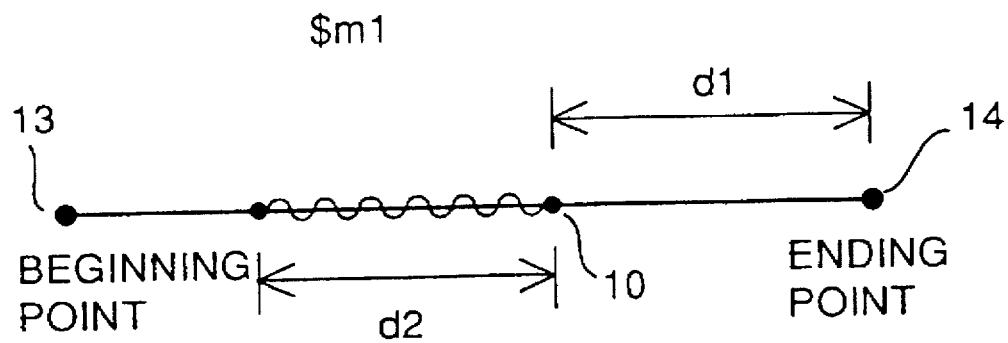
FIGS. 6a and 6b are adapted to illustrate road traffic information received by a navigation apparatus according to a second embodiment of the present invention.
Figure 6B:
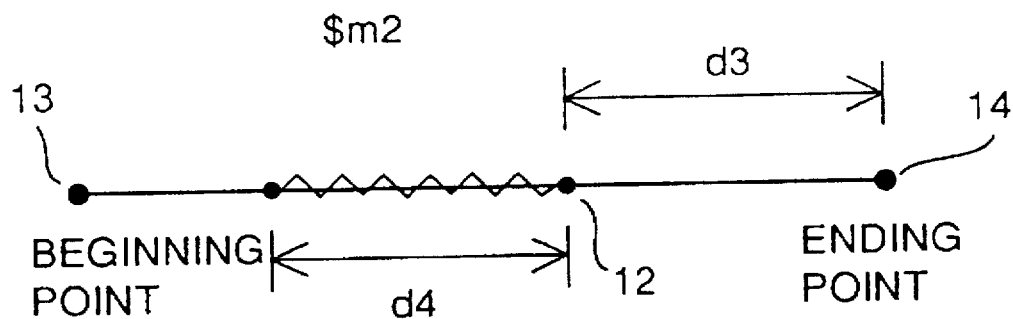

FIGS. 6a and 6b are adapted to illustrate road traffic information which is received by a navigation apparatus according to a second embodiment of the present invention.

The structure of the navigation apparatus according to the second embodiment and a conversion table employed therein are identical to those of the first embodiment shown in FIGS. 1 and 2, and hence redundant description is omitted. The navigation apparatus according to the second embodiment employs lengths of links for calculating a recommendable route.

Traffic information received by the navigation apparatus according to the second embodiment includes (a) congestion information and (b) control information.

Referring to FIG. 6a, the congestion information is data including the number ($m1) of an external link causing congestion, the degree of the congestion, the distance (d1) between the head 10 of the congestion and the ending point 14 of the external link, and the length (d2) of the portion which is congested. The degree of congestion is numeric data which is responsive or corresponding to the average traveling speed around the portion which is congested. This degree of congestion is numeric data of "1" or "2" when the average traveling speed around the portion respectively is 10 km/h to 20 km/h or less than 10 km/h, for example.

Referring to FIG. 6b, the control information is data including the number ($m2) of an external link which is subjected to traffic control, the content of the traffic control such as closure of the link or speed reduction, the distance (d3) between the head 12 of the traffic control and the ending point 14 of the external link, and the length (d4) of the portion which is controlled.

Figure 7:
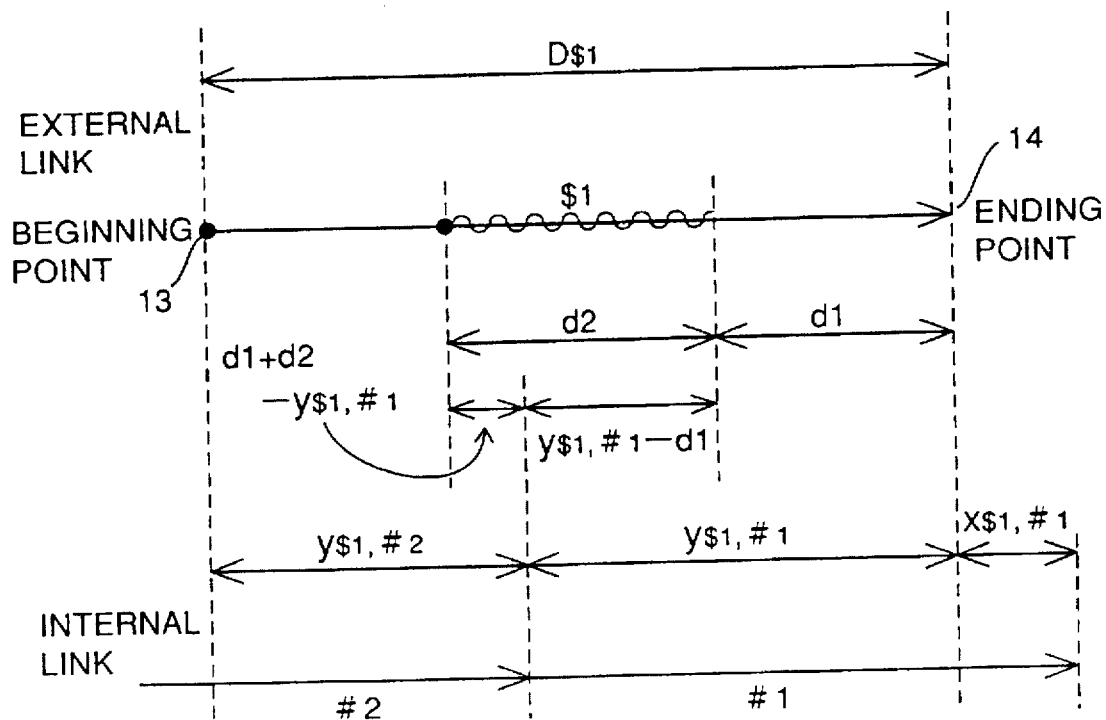
FIG. 7 is adapted to illustrate processing for updating the lengths of links in the navigation apparatus according to the second embodiment of the present invention.

FIG. 7 is adapted to illustrate processing for updating the lengths of links in the navigation apparatus according to the second embodiment.

It is assumed that an external link $1 which is an expressway is congested at a degree of "2", for example. The degree "2" of congestion indicates that the traveling speed around the expressway is reduced from the average ordinary or uncongested speed of 90 km/h to a congestion speed of 5 km/h in the congested portion (shown by a wavy line). At this time, an arithmetic operation of 90÷5=18 is carried out. The congested portion is converted to an effective length of 18 times the actual congested portion length.

In more concrete terms, a portion y$1,#1−d1 of the internal link #1 corresponds to the congested portion and hence a length of 17×(y$1,#1−d1) is added to the length of the internal link #1.

Further, a portion d1+d2−y$1,#1 of the internal link #2 corresponds to the congested portion and hence a length of 17×(d1+d2−y$1,#1) is added to the length of the internal link #2.

An internal link which is closed to traffic is so changed that its length is set to be infinite.

The navigation apparatus according to the second embodiment searches for a route having the minimum sum of link lengths between an origin and a destination, in consideration of the updated link lengths.

When the second storage part 109 stores a plurality of conversion tables corresponding to respective ones of stations transmitting a plurality of different traffic data in each of the first and second embodiments, it is possible to utilize a plurality of different traffic data transmitted from the stations.

While the route is displayed on a display unit in each of the aforementioned embodiments, information such as branch points and names of crossings on the obtained route, traveling directions on these points, and distances and times up to subsequent crossings and branch points may be outputted through a display or in a voice.

Further, the information receiving part may receive the traffic information through a radio beacon, a light beacon, wide-area broadcasting such as FM multiplex broadcasting, radio communication with a ground or mobile station, or a communication network such as a car telephone line. Alternatively, the traffic information may be inputted from an external storage unit such as an IC card, a hard disk, a floppy disk, a CD-ROM, an optical disk or a mini disk.

The information on the external links may be decoded in the information receiving part or the processing unit, while the decoded information need not be temporarily stored but may be directly converted to the link costs for the internal links.

While the map data for routing are stored in the CD-ROM and the conversion table indicating the correspondence between the external and internal links is stored in the second storage part so that these data are moved to the first storage part when necessary, the data may be stored in any internal or external storage part (e.g. the storage part including the CD-ROM, or the like). Further, the first and second storage parts may be integrated with each other.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A navigation apparatus for a land vehicle, comprising:

first storage means storing road data being formed by a network of a plurality of road links;

second storage means storing traveling cost data corresponding to respective ones of said road links;

receiving means receiving traffic information corresponding to a specific link being set for communication of traffic information;

identification means identifying one said road link corresponding to said received traffic information from said stored plurality of road links;

update means updating said stored traveling cost data corresponding to said identified road link on the basis of said received traffic information;

search means searching for a route between an origin and a destination in accordance with said stored road data and said traveling cost data including said updated traveling cost data; and table storage means storing a conversion table indicating a correspondence between said specific link and said road links; wherein said identification means identifies said one road link in accordance with said conversion table, said update means updates said traveling cost data in accordance with said conversion table, said conversion table includes data relating to said specific link, and data relating to one said road link corresponding to said specific link, said data relating to said specific link includes information concerning a number of said specific link, information concerning a length of said specific link, and information concerning a number of said one road link corresponding to said specific link, said data relating to said one road link corresponding to said specific link includes information concerning a number of said one road link corresponding to said specific link, information concerning a distance between an ending point of said specific link and an ending point of said one road link corresponding to said specific link, and information concerning a length of a portion where said specific link overlaps with said one road link corresponding to said specific link.

2. The navigation apparatus in accordance with claim 1, wherein said identification means identifies said one road link from the number of said specific link and the number of said one road link corresponding to said specific link, and said update means updates said traveling cost data on the basis of a ratio of the length of said specific link to the length of the portion of said one road link overlapping with said specific link.

3. The navigation apparatus in accordance with claim 1, wherein said traveling cost data include information concerning times required for traveling along respective ones of said road links.

4. The navigation apparatus in accordance with claim 1, wherein said traffic information includes information concerning the number of said specific link for defining said specific link, and information concerning a required time for passing through said specific link.

5. The navigation apparatus in accordance with claim 1, wherein said traffic information includes information indicating that said specific link is closed to traffic, said identification means identifies a particular identified one of said road links corresponding to said specific link that is closed to traffic, and said update means updates said stored traveling cost data corresponding to said identified road link by assigning thereto an infinite value.

6. The navigation apparatus in accordance with claim 1, wherein said traveling cost data include information concerning lengths of said road links.

7. The navigation apparatus in accordance with claim 6, wherein said specific link is suffering traffic congestion, and wherein said traffic information includes:

traffic information concerning a number of said specific link suffering said congestion, traffic information concerning a degree of said congestion, traffic information concerning a distance between a head of said congestion and an ending point of said specific link, and traffic information concerning a length of a portion of said specific link being congested with said congestion.

8. The navigation apparatus in accordance with claim 6, wherein said specific link is being subjected to traffic control, and wherein said traffic information includes:

traffic information concerning a number of said specific link being subjected to traffic control, traffic information concerning a content of said traffic control, traffic information concerning a distance between head of said traffic control and an ending point of said specific link, and traffic information concerning a length of a portion of said specific link being controlled by said traffic control.

9. The navigation apparatus in accordance with claim 6, wherein said first storage means and said second storage means are included in a single storage means.

10. The navigation apparatus in accordance with claim 1, wherein said table storage means is included in said second storage means.

11. The navigation apparatus in accordance with claim 1, wherein said specific link is an externally identified road link, and said road links are internally identified road links that do not correspond exactly with said externally identified road link.

12. The navigation apparatus in accordance with claim 1, wherein said specific link is suffering traffic congestion, and wherein said traffic information includes:

traffic information concerning a number of said specific link suffering said congestion, traffic information concerning a degree of said congestion, traffic information concerning a distance between a head of said congestion and an ending point of said specific link, and traffic information concerning a length of a portion of said specific link being congested with said congestion.

13. The navigation apparatus in accordance with claim 1, wherein said specific link is being subjected to traffic control, and wherein said traffic information includes:

traffic information concerning a number of said specific link being subjected to traffic control, traffic information concerning a content of said traffic control, traffic information concerning a distance between a head of said traffic control and an ending point of said specific link, and traffic information concerning a length of a portion of said specific link being controlled by said traffic control.

14. The navigation apparatus in accordance with claim 1, wherein said first storage means and said second storage means are included in a single storage means.

15. The navigation apparatus in accordance with claim 2, wherein said specific link is suffering traffic congestion, and wherein said traffic information includes:

traffic information concerning a number of said specific link suffering said congestion, traffic information concerning a degree of said congestion, traffic information concerning a distance between a head of said congestion and an ending point of said specific link, and traffic information concerning a length of a portion of said specific link being congested with said congestion.

16. The navigation apparatus in accordance with claim 2, wherein said specific link is being subjected to traffic control, and wherein said traffic information includes:

traffic information concerning a number of said specific link being subjected to traffic control, traffic information concerning a content of said traffic control, traffic information concerning a distance between a head of said traffic control and an ending point of said specific link, and traffic information concerning a length of a portion of said specific link being controlled by said traffic control.

17. The navigation apparatus in accordance with claim 2, wherein said first storage means and said second storage means are included in a single storage means.

18. A method of processing navigation information using a navigation apparatus having stored therein road data comprising a network of a plurality of internal road links, and traveling cost data associated with respective ones of said internal road links, for navigating a land vehicle traveling on a road network including a plurality of external road links and an external traffic information transmitter, comprising the following steps:

(a) receiving from said transmitter traffic information corresponding to one of said external road links;

(b) storing in a conversion table in said apparatus data relating to an identifying label of said external road link, data relating to a length of said external road link, data relating to at least one respective identifying label of at least one corresponding one of said internal road links that at least partially corresponds with said external road link, and, for each of said at least one corresponding internal road link, data relating to a respective distance between an endpoint of said external road link and an endpoint of said at least one corresponding internal road link and data relating to a respective length of an overlap between said external road link and said at least one corresponding internal road link;

(c) identifying said at least one corresponding internal road link that at least partially corresponds with said external road link, in accordance with said data stored in said conversion table;

(d) updating said traveling cost data respectively associated with said at least one identified internal road link, in accordance with said data stored in said conversion table; and (e) searching for a travel route between an origin and a destination in accordance with said stored road data and said updated traveling cost data.

19. The method in accordance with claim 18, wherein said updating of an original traveling cost data associated with a given one of said internal road links comprises maintaining a first fractional portion of said original traveling cost data corresponding to a portion of said given internal road link that does not overlap said external road link, and revising a second fractional portion of said original traveling cost data corresponding to a portion of said given internal road link that does overlap said external road link to be equal to a third fractional portion of an external traveling cost data associated with said external road link, wherein said third fractional portion corresponds to a portion of said external road link that overlaps with said given internal road link.

* * * * *

UNITED STATES PATENT AND TRADEMARK OFFICE
CERTIFICATE OF CORRECTION

PATENT NO. : 5,712,632
DATED : Jan. 27, 1998
INVENTOR(S) : Nishimura et al.

It is certified that error appears in the above-identified patent and that said Letters Patent is hereby corrected as shown below.

| | | |
|---|---|---|
| Col. 3, | line 66, | delete "k" and instead insert --$\underline{k}$--; |
| Col. 4, | line 47, | delete "=m" and instead insert --= 0 m--; |
| Col. 5, | line 34, | after "part" insert --103--; |
| Col. 9, | line 40, | after "between" insert --a--. |

Signed and Sealed this

Ninth Day of June, 1998

*Attest:*

BRUCE LEHMAN

*Attesting Officer*   Commissioner of Patents and Trademarks